United States Patent
Huang et al.

(10) Patent No.: US 8,464,201 B2
(45) Date of Patent: Jun. 11, 2013

(54) ELECTRONIC DEVICE AND SIMULATION METHOD FOR CHECKING PRINTED CIRCUIT BOARD POWER LOSS

(75) Inventors: Tsung-Sheng Huang, New Taipei (TW);
Chun-Jen Chen, New Taipei (TW);
Duen-Yi Ho, New Taipei (TW);
Wei-Chieh Chou, New Taipei (TW);
Shin-Ting Yen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/441,849

(22) Filed: Apr. 7, 2012

(65) Prior Publication Data
US 2013/0007690 A1     Jan. 3, 2013

(30) Foreign Application Priority Data

Jun. 30, 2011   (TW) ............................. 100123022 A

(51) Int. Cl.
*G06F 17/50*     (2006.01)
*G06G 7/62*      (2006.01)

(52) U.S. Cl.
USPC ............. 716/137; 716/133; 716/120; 703/13

(58) Field of Classification Search
None
See application file for complete search history.

(56) References Cited

U.S. PATENT DOCUMENTS

| | | | |
|---|---|---|---|
| 6,847,853 B1 * | 1/2005 | Vinciarelli et al. | 700/97 |
| 7,831,949 B2 * | 11/2010 | Tokunaga et al. | 716/137 |
| 8,255,862 B2 * | 8/2012 | Huang et al. | 716/137 |

* cited by examiner

*Primary Examiner* — A. M. Thompson
(74) *Attorney, Agent, or Firm* — Altis Law Group, Inc.

(57) ABSTRACT

An electronic device reads a layout file of a printed circuit board (PCB) to be manufactured from a storage device, obtains length information and section area information of copper cladding distributed on power source areas and ground trace areas in each of one or more layers of the PCB to be manufactured by analyzing the layout file, and calculates power loss in each of the one or more layers according to the length information, the section area information, a resistance value of the copper cladding, and preset parameters of a power supply module and an integrated circuit (IC) load to be located on the PCB. In response to a determination that the power loss in the layer exceeds a preset range, the electronic device indicates the locations of the power source areas and the ground trace areas of a layer in the PCB layout file which need to be redesigned.

12 Claims, 4 Drawing Sheets

ELECTRONIC DEVICE AND SIMULATION METHOD FOR CHECKING PRINTED CIRCUIT BOARD POWER LOSS

BACKGROUND

1. Technical Field

The embodiments of the present disclosure relate to circuit design technology, and particularly to an electronic device and a simulation method for checking power loss of a printed circuit board (PCB).

2. Description of Related Art

A PCB production process may include designing a PCB layout by a design department, manufacturing a printed wiring board (i.e., a bare board) according to the PCB layout, and printing components on the PCB to produce a sample board of the PCB. Before mass-producing the PCB according to the sample board, the sample board is tested by a test department for efficient use of electrical power. If the power used by the sample board is not satisfactory, the PCB layout would be reviewed to find out design defects and to correct design defects. One problem of the aforementioned method is that the design department has to wait for the test result from the test department to know if the PCB layout is satisfactory. Another problem is that the test result may not highlight the precise location(s) of the design defects. Therefore, a method for simulating power loss of PCBs based on the PCB layout is desired to perform before the PCBs being manufactured, so that less PCBs needs to be redesigned.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
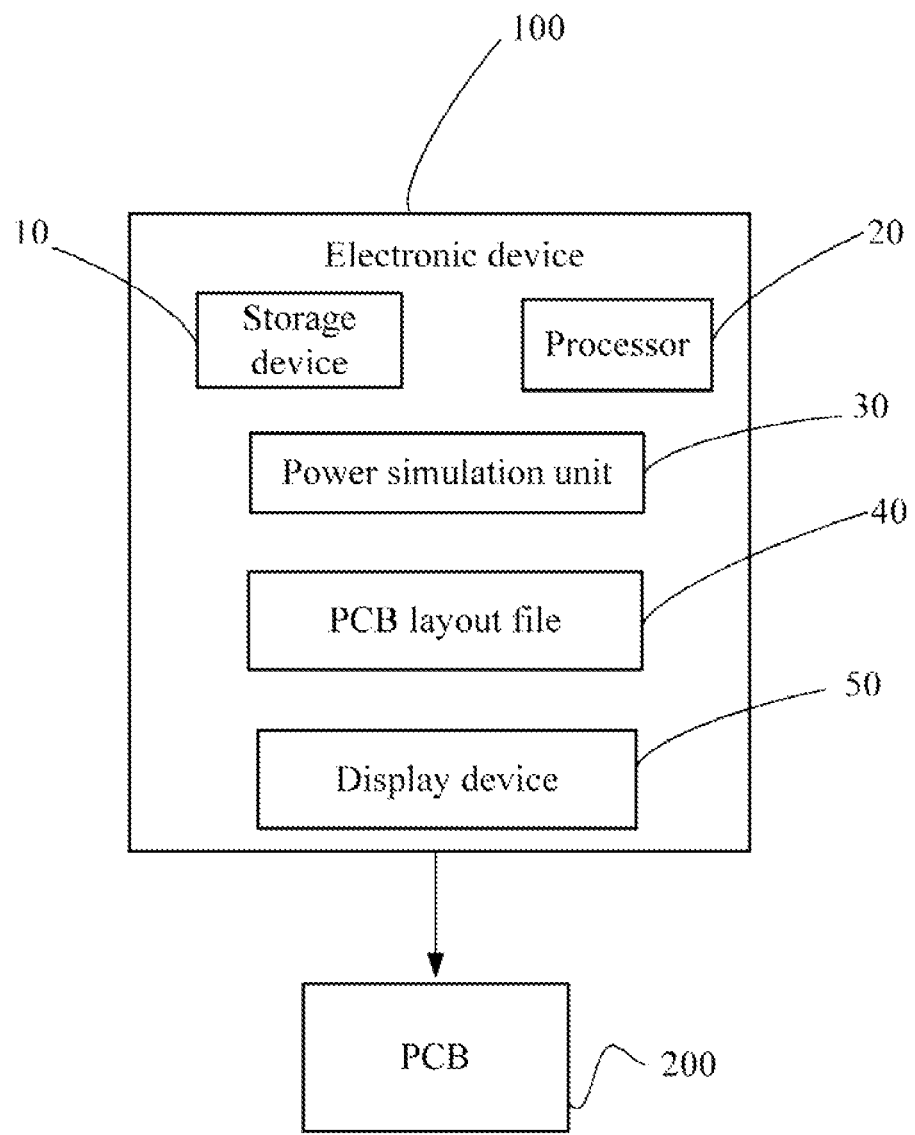
FIG. 1 is one embodiment of a block diagram of an electronic device including a power simulation unit for checking power loss of a printed circuit board (PCB).

FIG. 1 is one embodiment of a block diagram of an electronic device 100. In one embodiment, the electronic device 100 includes a storage device 10, a processor 20, a power simulation unit 30, a printed circuit board (PCB) layout file 40, and a display device 50. The electronic device 100 may be a computer, a server, or other electronic device that has data processing function. The storage device 10 stores the PCB layout file 40, which defines wiring and connection information and components information in relation to a PCB 200 to be manufactured. In one embodiment, the PCB 200 to be manufactured is a multilayer board, which may include, but is not limited to, internal power planes, outer signal layers, and ground planes. Each of the layers includes one or more power source areas and one or more ground trace areas that are covered by copper cladding. Vias pass through the power source areas and ground trace areas distributed in the multiple layers, and are used as conductive connections between the multiple layers. When electrical current passes through the power source areas and ground trace areas covered by the copper cladding, some electrical power is consumed by the copper cladding because of electrical resistance of the copper cladding.

The power simulation unit 30 obtains length information and section area information of the copper cladding distributed on the power source areas and ground trace areas on each of the multiple layers by analyzing the PCB layout file 40, and simulates the theoretical power loss in each of the multiple layers based on the length information, the section area information of the copper cladding, and a resistance value of the copper cladding. If the power loss in a layer falls outside an allowable preset quantity for the power loss, the power simulation unit 30 indicates the particular position(s) on the layer of the power source areas and ground trace areas on the layer to warn that these copper cladding distributions on the layer in relation to the PCB layout file 40 need to be amended and redesigned.

Figure 2:
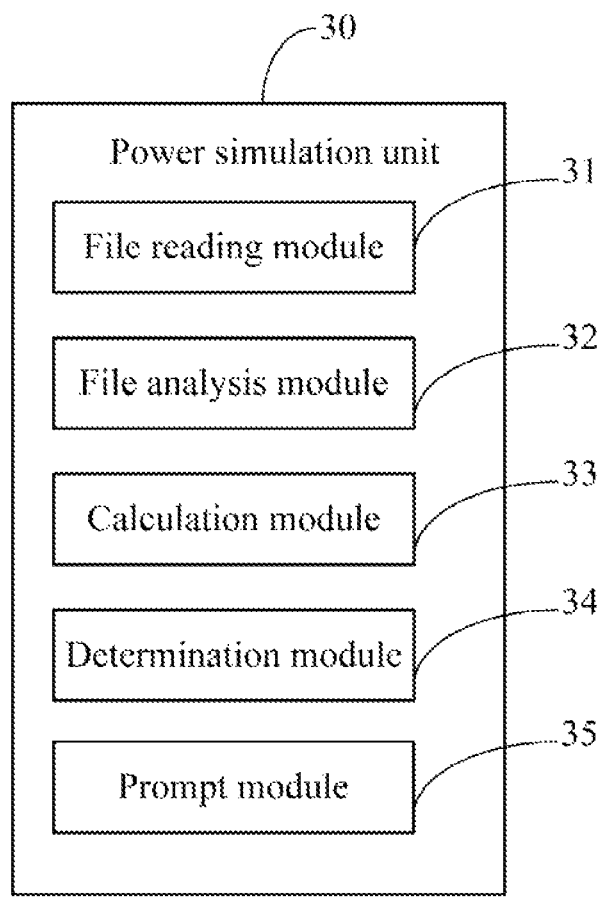
FIG. 2 is one embodiment of function modules of the power simulation unit in FIG. 1.

As shown in FIG. 2, the power simulation unit 30 includes a file reading module 31, a file analysis module 32, a calculation module 33, a determination module 34, and a prompt module 35. The modules 31-35 may include computerized code in the form of one or more programs that are stored in the storage device 10. The computerized code includes instructions to be processed by the processor 20 to provide the aforementioned functions of the power simulation unit 30. A description of the functions of the modules 31-35 is given in FIG. 3. The storage device 10 may be a cache or a dedicated memory, such as an erasable programmable read only memory (EPROM), a hard disk driver (HDD), or flash memory.

Figure 3:
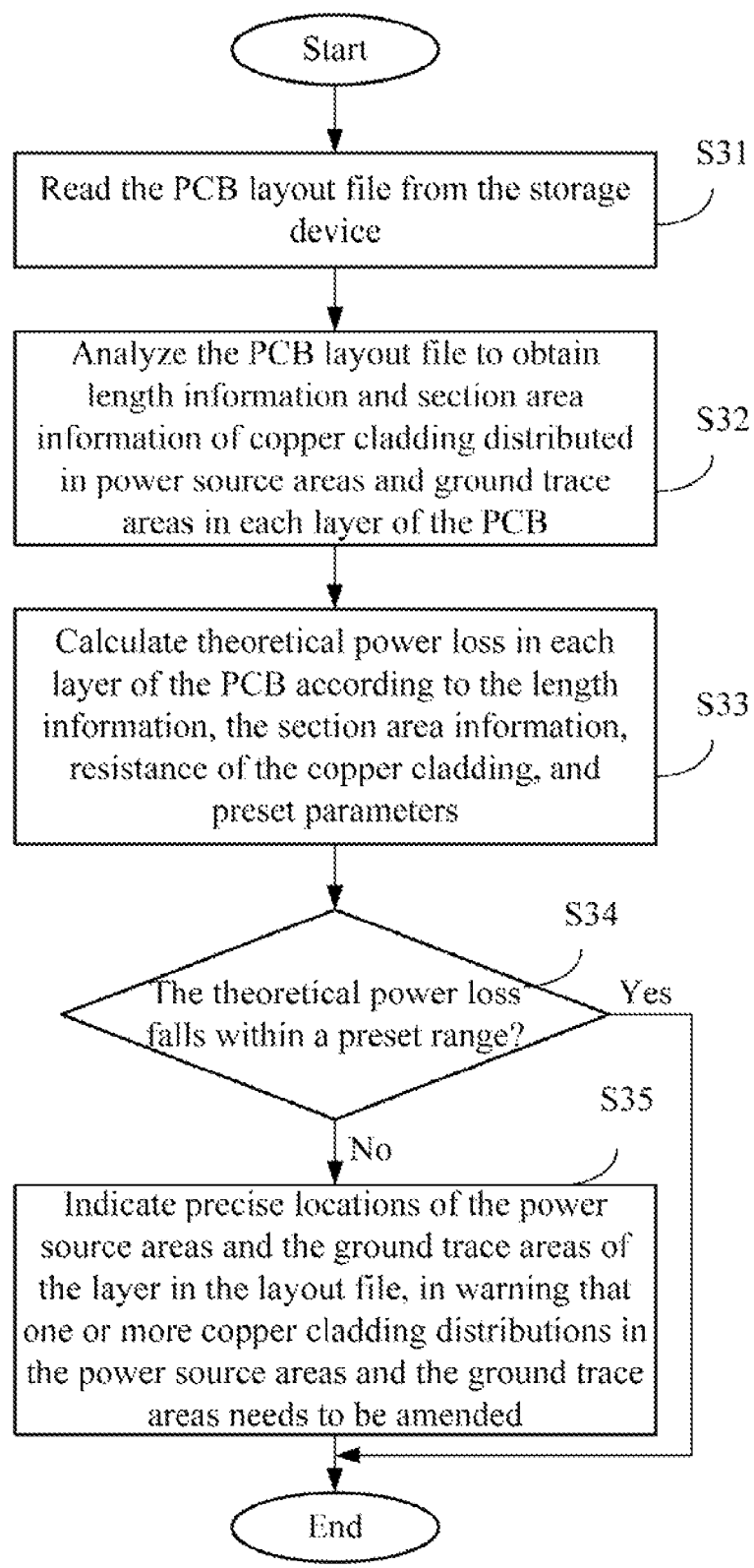
FIG. 3 is a flowchart of one embodiment of a simulation method for checking PCB power loss.

FIG. 3 is a flowchart of one embodiment of a simulation method for checking PCB power consumption. Depending on the embodiment, additional steps may be added, others removed, and the ordering of the steps may be changed.

In step S31, the file reading module 31 reads the PCB layout file 40 from the storage device 10.

Figure 4:
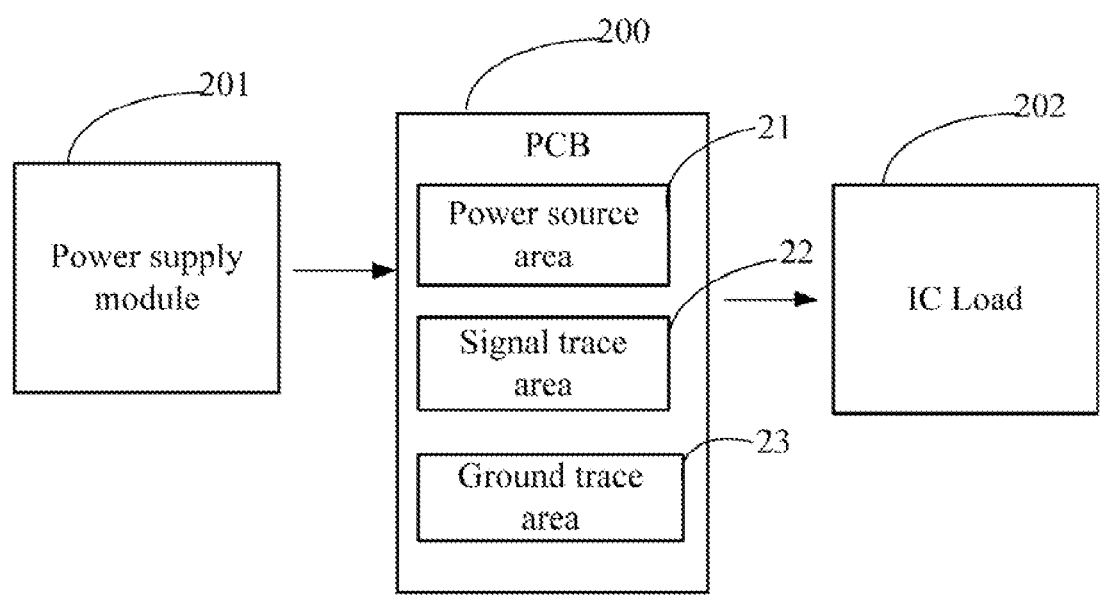
FIG. 4 is one embodiment of function modules of the PCB in FIG. 1.

In step S32, the file analysis module 32 analyzes the PCB layout file 40 to obtain length information and section area information of copper cladding distributed on power source areas and ground trace areas in each layer of the PCB 200. The PCB 200 is a board with multiple layers, which may include, but are not limited to, internal power planes, outer signal layers, and ground planes. Each of the layers includes one or more power source areas and one or more ground trace areas that are covered by the copper cladding. For example, as shown in FIG. 4, an outer signal layer of the PCB 200 may include a power source area 21, a signal trace area 22, and a ground trace area 23. Current provided to the PCB 200 by a power supply module 201 may pass through the power source area 21 or the ground trace area 23 to reach an integrated circuit (IC) load 202 or other load located on the PCB 200. The IC load 202 may be a memory chip or a central processing unit (CPU), for example. The PCB layout file 40 includes wiring and connection information and components information of the PCB 200. The wiring information may include a length L of the copper cladding distributed on each area (e.g., a power source area or a ground trace area), a quality m of the copper cladding distributed on the area, and a density p of the copper cladding. Then, the electrical properties of a section area S of the copper cladding distributed on the area may be determined according to a formula S=m/(p×L). The file analysis module 32 analyzes the wiring information to obtain the length information and the section area information of the copper cladding distributed on the power source areas and ground trace areas of each layer of the PCB 200.

In step S33, the calculation module 33 calculates the theoretical loss of electrical power in each layer of the PCB 200 according to the length information, the section area information, a resistance value of the copper cladding, and certain preset parameters. In one embodiment, the preset parameters include a voltage U of the power supply module 201 and a demand current I of the IC load 202. For example, if U=1 volt, I=1 A, the section area of the copper cladding distributed in an area (such as a power source area) is S, the length of the copper cladding distributed in the area is L, and a resistance value of the copper cladding is R, then the power loss of the area is calculated according to a formula W=R×L/S=R×L×(p×L)/m. The power loss in each layer of the PCB 200 is a sum of the power losses in all power source areas and ground trace areas on the layer. For example, the power loss of the outer signal layer of the PCB 200, which includes the power source area 21 and the ground trace area 23, equals power loss of the power source area 21 and power loss of the ground trace area 23.

In step S34, the determination module 34 determines if the theoretical power loss in each layer falls within a preset range. For example, the preset range may be less than 1.49334e-5. If the power loss in a layer falls within the preset range, the determination module 34 determines that the copper cladding distribution on the layer satisfies design requirements, and the procedure ends. Otherwise, if the power loss in any layer exceeds the preset range, the procedure goes to step S35.

In step S35, the prompt module 35 indicates the precise locations of the power source areas and the ground trace areas of the layer in the PCB layout file 40, in warning that one or more copper cladding distributions (such as the length L or the section area S) in the power source areas and the ground trace areas needs to be amended. For example, if the power loss calculated in the outer signal layer, which includes the power source area 21 and the ground trace area 23 shown in FIG. 4, exceeds the preset range, the prompt module 35 may highlight the power source area 21 and the ground trace area 23 in the PCB layout file 40.

The above embodiments provide a reliable determination as to whether or not the copper cladding distributions on a PCB satisfy design requirements, based on information provided by the PCB's layout file before manufacturing the PCB, to avoid producing unsatisfactory or unqualified PCBs.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A simulation method for checking power loss of a printed circuit board (PCB) to be manufactured being performed by execution of instructions by a processor of an electronic device, the method comprising:

reading a layout file of the PCB from a storage device of the electronic device;

obtaining length information and section area information of copper cladding distributed on power source areas and ground trace areas in each of one or more layers of the PCB by analyzing the layout file;

calculating theoretical power loss in each of the one or more layers according to the length information, the section area information, a resistance value of the copper cladding, and preset parameters of a power supply module and an integrated circuit (IC) load located on the PCB;

determining whether the theoretical power loss of each of the one more layers falls outside a preset range; and indicating precise locations of the power source areas and the ground trace areas of each of the one or more layers in the layout file, in warning that one or more copper cladding distributions in the power source areas and the ground trace areas needs to be amended, in response to the determination that the theoretical power loss in each of the one or more layers falls outside the preset range.

2. The simulation method of claim 1, wherein the layout file comprises information in relation to a length L of the copper cladding distributed on each area, a quality m of the copper cladding distributed on the area, and a density p of the copper cladding, and the section area S of the copper cladding distributed on the area is determined according to a formula S=m/(p×L), wherein S, m, p, and L are real numbers.

3. The simulation method of claim 1, wherein the theoretical power loss in a layer of the PCB is a sum of power losses in all power source areas and ground trace areas on the layer.

4. The simulation method of claim 1, wherein the preset parameters comprise a voltage of the power supply module and a demand current of the IC load.

5. A non-transitory computer-readable medium storing a set of instructions, the set of instructions being executed by a processor of an electronic device to perform a simulation method for checking power loss of a printed circuit board (PCB) to be manufactured being performed by execution of instructions by a processor of an electronic device, the method comprising:

reading a layout file of the PCB from a storage device of the electronic device;

obtaining length information and section area information of copper cladding distributed on power source areas and ground trace areas in each of one or more layers of the PCB by analyzing the layout file;

calculating theoretical power loss in each of the one or more layers according to the length information, the section area information, a resistance value of the copper cladding, and preset parameters of a power supply module and an integrated circuit (IC) load located on the PCB;

determining whether the theoretical power loss of each of the one or more layers falls outside a preset range; and indicating precise locations of the power source areas and the ground trace areas of each of the one or more layers in the layout file, in warning that one or more copper cladding distributions in the power source areas and the ground trace areas needs to be amended, in response to the determination that the theoretical power loss in each of the one or more layers falls outside the preset range.

6. The non-transitory computer-readable medium of claim 5, wherein the layout file comprises information in relation to a length L of the copper cladding distributed on each area, a quality m of the copper cladding distributed on the area, and a density p of the copper cladding, and the section area S of the copper cladding distributed on the area is determined according to a formula S=m/(p×L) wherein S, m, p, and L are real numbers.

7. The non-transitory computer-readable medium of claim 5, wherein the theoretical power loss in a layer of the PCB is a sum of power losses in all power source areas and ground trace areas on the layer.

8. The non-transitory computer-readable medium of claim 5, wherein the preset parameters comprise a voltage of the power supply module and a demand current of the IC load.

9. An electronic device, comprising:
   a storage device;
   a processor; and
   one or more programs stored in the storage device and being executable by the processor, the one or more programs comprising:
   a file reading module operable to read a layout file of a printed circuit board (PCB) to be manufactured from a storage device of the electronic device;
   a file analysis module operable to obtain length information and section area information of copper cladding distributed on power source areas and ground trace areas in each of one or more layers of the PCB by analyzing the layout file;
   a calculation module operable to calculate theoretical power loss in each of the one or more layers according to the length information, the section area information, a resistance value of the copper cladding, and preset parameters of a power supply module and an integrated circuit (IC) load located on the PCB;
   a determination module operable to determine if the theoretical power loss in each of the one or more layers falls within a preset range; and
   a prompt module operable to indicate precise locations of the power source areas and the ground trace areas of the one or more layers in the layout file, in warning that one or more copper cladding distributions in the power source areas and the ground trace areas needs to be amended, in response to the determination that the theoretical power loss in each of the one or more layers falls outside the preset range.

10. The electronic device of claim 9, wherein the layout file comprises information in relation to a length L of the copper cladding distributed on each area, a quality m of the copper cladding distributed on the area, and a density p of the copper cladding, and the section area S of the copper cladding distributed on the area is determined according to a formula S=m/(p×L), wherein S, m, p, and L are real numbers.

11. The electronic device of claim 9, wherein the theoretical power loss in a layer of the PCB is a sum of power losses in all power source areas and ground trace areas on the layer.

12. The electronic device of claim 9, wherein the preset parameters comprise a voltage of the power supply module and a demand current of the IC load.

* * * * *